(12) United States Patent
Ruiz et al.

(10) Patent No.: US 8,820,860 B2
(45) Date of Patent: Sep. 2, 2014

(54) FIBER OPTIC ENCLOSURE HAVING TAMPER RESISTANT LOCK

(75) Inventors: Gil Ruiz, McKinney, TX (US); Thomas Crain, Melissa, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 276 days.

(21) Appl. No.: 13/213,669

(22) Filed: Aug. 19, 2011

(65) Prior Publication Data

US 2012/0049711 A1 Mar. 1, 2012

Related U.S. Application Data

(60) Provisional application No. 61/377,754, filed on Aug. 27, 2010.

(51) Int. Cl.
  *E05C 7/06* (2006.01)
  *G02B 6/44* (2006.01)
  *E05C 3/04* (2006.01)
  *E05B 17/20* (2006.01)

(52) U.S. Cl.
  CPC ............... *E05C 3/042* (2013.01); *G02B 6/4452* (2013.01); *E05B 17/2088* (2013.01); *Y10S 292/11* (2013.01)
  USPC .... 312/222; 312/328; 292/194; 292/DIG. 11; 292/197; 70/84; 70/131; 70/136; 70/137; 70/139; 70/63

(58) Field of Classification Search
  CPC .... E05B 17/2088; E05C 3/042; G02B 6/4452
  USPC ......... 312/109, 215, 222, 326, 327, 328, 329; 70/77–80, 84, 91, 101, 102, 116, 70/121–123, 131, 135–137, 142, 452, 63, 70/139; 292/124, 128, 98, 101–104, 108, 292/194, 224, 228, 195, 197, 202–205, 210, 292/DIG. 11
  See application file for complete search history.

(56) References Cited

U.S. PATENT DOCUMENTS 2,257,741 A * 10/1941 Gray ................................. 70/85
3,161,427 A * 12/1964 Anders ......................... 292/194

(Continued)

FOREIGN PATENT DOCUMENTS

| JP | 08-072923 A | 3/1996 |
| JP | 09-235930 A | 9/1997 |
| KR | 10-0928030 B1 | 11/2009 |

OTHER PUBLICATIONS

Medeco cam locks catalog, Medeco Security Locks, Inc. 2009, pp. 1-16, http://www.medeco.com/ medeco_products/pdf/R-041609A%20Cam%20Lock%20Catalog.pdf.

*Primary Examiner* — Darnell Jayne
*Assistant Examiner* — Ryan A Doyle
(74) *Attorney, Agent, or Firm* — Muncy, Geissler, Olds & Lowe, P.C.

(57) ABSTRACT

A housing includes a first panel having a keeper, a hinged door shiftable between a first position generally perpendicular to the first panel and a second position, and a lock mounted on the door, the lock comprising a rotatable cylinder having an axis of rotation perpendicular to the door and a cam. The cam has a first end connected to the cylinder for rotation with the cylinder and a second end spaced from the first end by a cam body, the second end extending at an angle to the cam body and lying in a second plane parallel to the axis of rotation. When the door is in the first position, the cam is shiftable from a first orientation with the cam second end spaced from the keeper to a second orientation with the cam second end overlying a side of the keeper opposite the cylinder to lock the door.

18 Claims, 5 Drawing Sheets

(56) References Cited

U.S. PATENT DOCUMENTS

| | | | | |
|---|---|---|---|---|
| 3,563,068 A | * | 2/1971 | Dushane, Jr. | 70/100 |
| 3,586,360 A | * | 6/1971 | Perrotta | 292/26 |
| 3,790,244 A | * | 2/1974 | Stackhouse | 312/215 |
| 3,877,739 A | * | 4/1975 | Cowen | 292/101 |
| 4,010,989 A | * | 3/1977 | Klug | 312/204 |
| 4,040,653 A | * | 8/1977 | Takahashi | 292/202 |
| 4,186,952 A | * | 2/1980 | Glass | 292/202 |
| 4,341,166 A | * | 7/1982 | Cantley | 109/53 |
| 4,880,262 A | * | 11/1989 | Mugnolo et al. | 292/202 |
| 5,249,443 A | * | 10/1993 | Anderson | 70/370 |
| 5,598,323 A | * | 1/1997 | Muller | 361/726 |
| 5,778,130 A | * | 7/1998 | Walters et al. | 385/134 |
| 5,927,766 A | * | 7/1999 | Rosen | 292/101 |
| 6,038,892 A | * | 3/2000 | Schmitt | 70/78 |
| 6,515,227 B1 | * | 2/2003 | Massey et al. | 174/50 |
| 6,582,036 B2 | * | 6/2003 | Alexander et al. | 312/326 |
| 6,966,206 B2 | * | 11/2005 | Masseth et al. | 70/370 |
| 7,441,427 B2 | * | 10/2008 | Vickers | 70/127 |
| 7,726,751 B2 | * | 6/2010 | Bergmann et al. | 312/222 |
| 8,491,020 B2 | * | 7/2013 | Lopes | 292/194 |
| 2002/0060456 A1 | * | 5/2002 | Linares | 292/103 |
| 2007/0252490 A1 | * | 11/2007 | Cleveland et al. | 312/107 |
| 2008/0175552 A1 | * | 7/2008 | Smrha et al. | 385/135 |
| 2008/0190156 A1 | * | 8/2008 | Nowicky et al. | 70/452 |
| 2010/0170310 A1 | | 7/2010 | Ivashin | |
| 2011/0274402 A1 | * | 11/2011 | Giraud et al. | 385/135 |

* cited by examiner

FIBER OPTIC ENCLOSURE HAVING TAMPER RESISTANT LOCK

CROSS-REFERENCE TO RELATED APPLICATIONS

The present application claims the benefit of U.S. Provisional Patent Application No. 61/377,754 filed Aug. 27, 2010, the entire contents of which are hereby incorporated by reference.

FIELD OF THE INVENTION

The present invention is directed to a fiber optic enclosure with a door securable in a closed position by a cam lock, and, more specifically, toward a fiber optic enclosure with a door securable in a closed position by a cam lock configured to substantially prevent a portion of the housing adjacent to the lock from being pried away from the cam lock.

BACKGROUND

Optical fiber enclosures are known that contain various components for connecting optical fibers from a trunk cable to optical patch cables at a customer location. These enclosures or housings may be rack-mountable and may have front and/or rear hinged doors for providing access to the housing interior and the various fibers and components therein. One or both of these doors may be lockable using, for example, a cam lock.

The locking portion of a conventional housing 100 is illustrated in FIG. 11 which housing includes a top panel 102 and a door 104 hingedly connected to a support (not illustrated) so that a free edge 106 of the door 104 can swing toward and away from the top panel 102. A lock 108, which may comprise a conventional cam lock, includes a cylinder 110 that rotates when a key (not illustrated) is inserted in keyway 112 and rotated, and a cam 114 that rotates with the cylinder 110. In a locked position, illustrated with solid lines in FIG. 11, the cam extends through a slot 116 in the top panel 102 to prevent the door 104 from pivoting away from the top panel 102. The cam 114 can be rotated out of slot 116 to the orientation illustrated with chain-dashed lines in FIG. 11 to allow the door 104 to be opened. This conventional arrangement provides a reasonable degree of security for the components located inside housing 100. However, slot 116 is generally located near a central portion of the top panel 102. If the top panel 102 is formed from a material that can be readily deformed, relatively thin sheet metal, for example, it may be possible to pry or bend the portion of top panel 102 near slot 116 away from cylinder 110 so that cam 114 no longer extends through slot 116. This allows door 104 to be opened without using a key and without changing the orientation of cylinder 110.

The foregoing problem could be addressed by using various types of conventional locks having bolts or complicated latching mechanisms—a padlock and associated hasps could be mounted to the enclosure for increased security, for example. However, such approaches may substantially increase the cost and complexity of assembling and using such an optical fiber enclosure. It would therefore be desirable to provide a tamper-resistant optical fiber enclosure that operates in a manner similar to conventional lockable enclosures without the need for complicated and/or expensive modifications.

SUMMARY OF THE INVENTION

These and other issues are addressed by embodiments of the present invention, a first aspect of which comprises a housing having a first panel lying in a first plane, which panel includes a keeper, a support member spaced from the first panel, and a door having a hinge edge hingedly connected to the support member and a free edge opposite the hinge edge, the door being shiftable between a first position generally perpendicular to the first panel and a second position. The door includes a lock comprising a rotatable cylinder having an axis of rotation perpendicular to the door and a cam having a first end connected to the cylinder for rotation with the cylinder and a second end spaced from the first end by a cam body. The second end extends at an angle to the cam body and lies in a second plane parallel to the axis of rotation. When the door is in the first position, the cam is shiftable from a first orientation with the cam second end spaced from the keeper and a second orientation with the cam second end overlying a side of the keeper opposite the cylinder to lock the door.

Another aspect of the invention comprises a housing having a first panel lying in a first plane and including a keeper arrangement, a support member spaced from the first panel, and a door having a hinge edge hingedly connected to the support member and a free edge opposite the hinge edge. The door is shiftable between a first position with the free edge in contact with the first panel and a second position with the free edge spaced from the first panel. A lock is mounted on the door and includes a rotatable cylinder having an axis of rotation perpendicular to the door, the cylinder being shiftable between a first orientation and a second orientation angularly offset from the first orientation. The lock further includes a cam mechanism rotatable with the cylinder for engaging the keeper arrangement and limiting movement of the door free edge away from the first panel and for limiting movement of the first panel in a direction perpendicular to the plane when the cylinder is in the first position and the door is in the first position and for allowing movement of the door free edge away from the first panel when the cylinder is in the second position.

A further aspect of the invention comprises a housing that includes a first panel lying in a first plane with an inner side facing into the housing and an outer side opposite the inner side. An opening with a side wall extends through the first panel and has a continuous periphery spaced from an edge of the panel. The opening includes a first portion having a first width in a direction perpendicular to the first edge and a second portion having a second width in the direction, the second width being greater than the first width. The housing also includes a second panel parallel to and spaced from the first panel and a door having a hinge edge hingedly connected to the second panel and a free edge opposite the hinge edge. The door is shiftable between a first position with the free edge in contact with the first panel and a second position with the free edge spaced from the first panel, and a lock is mounted on the door. The lock includes a key-actuated rotatable cylinder having an axis of rotation perpendicular to the door and a cam having a first end connected to the cylinder for rotation with the cylinder and a second end spaced from the first end by a cam body. The second end extends at an angle to the cam body and lies in a second plane parallel to the axis of rotation and has a length in the direction greater than the first width. When the door is in the first position, the cam is shiftable from a first orientation with the cam second end inside the housing to a second orientation with the cam second end overlying the first panel outer side, and the cam body engages the opening side wall to prevent the door from moving toward the second position when the cam is in the second orientation. The cam second end is spaced from the first panel when the cam body is located in the first portion.

BRIEF DESCRIPTION OF THE DRAWINGS

These and other aspects of the present invention will be better understood after a reading of the following detailed description together with the attached drawings wherein.

DETAILED DESCRIPTION

Figure 1:
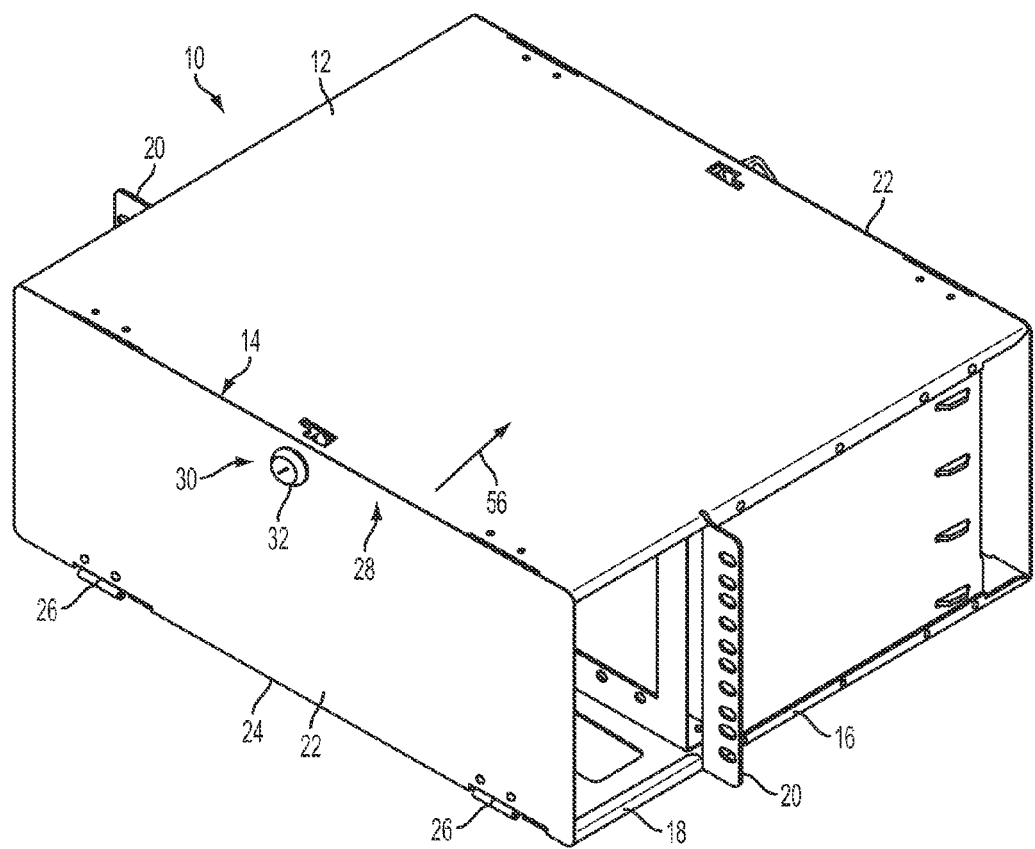
FIG. 1 is a perspective view of a housing having a keeper and a door having a cam lock according to an embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 illustrates a housing 10 having a top panel 12 with a first edge 14, a bottom panel 16 having a support member 18 connected thereto or integrally formed therewith, and mounting brackets 20 for mounting housing 10 to a rack (not illustrated). Housing 10 further includes a door 22 having a hinge edge 24 connected to support member 18 by hinges 26 and a free edge 28. Door 22 is configured to pivot about the axes of the hinges 26 between a first position with free edge 28 in contact with first edge 14 of top panel 12 and a second position with free edge 28 spaced from first edge 14 by some degree, e.g., 90 degrees, 180 degrees or some other amount sufficient to allow access to the interior of the housing 10. A second door 22 may be provided on an opposite side of the housing 10.

Door 22 includes a lock indicated generally by reference numeral 30 which lock comprises a keyway 32 for receiving a key (not illustrated), a cylinder 34 which is rotated by the rotation of the key in keyway 32 and a cam 36 having a first end 38 connected to cylinder 34, a cam body 40 and a cam second end 42. Connected in this manner, the rotation of the cylinder 34 cause the cam second end 42 to trace out an arc and shift between a first orientation, with the cam 36 extending, for example, generally parallel to door free edge 28 and a second position extending perpendicularly to the door free edge 28. Cam second end 42 extends at an angle, such as 90 degrees, to the cam body 40 and lies in a plane generally parallel to the axis of rotation of the cylinder 34. In the present embodiment, cam body 40 is generally perpendicular to the axis of rotation of cylinder 34; however, an alternate cam may be employed that includes a cam body extending at an angle other than 90 degrees to the axis of rotation of the cam. In such case, the cam second end will still lie in a plane parallel to the axis of rotation of the cylinder and will be angled accordingly relative to the cam body.

Figure 2:
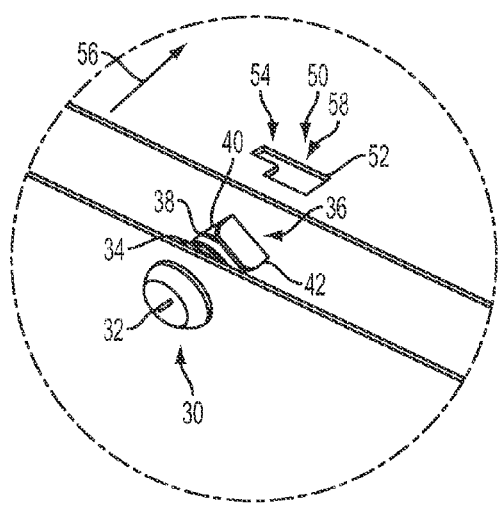
FIG. 2 is a perspective view of the door of FIG. 1 in an open position with the cam lock in a first orientation.
Figure 3:
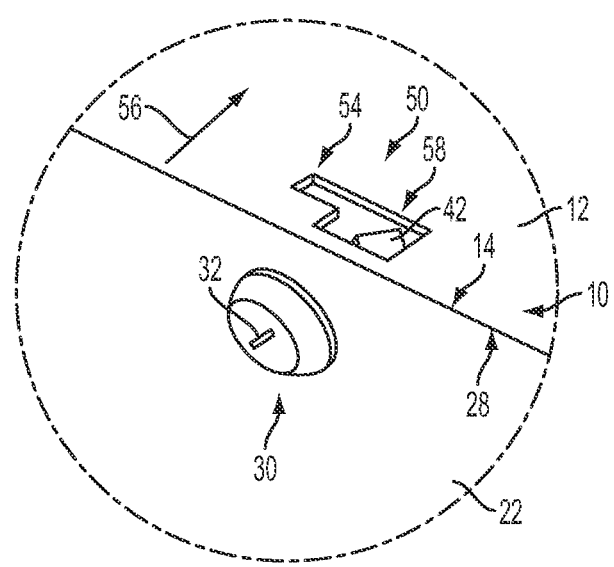
FIG. 3 is a perspective view of the door of FIG. 1 in a closed position with the cam lock in the first orientation.
Figure 4:
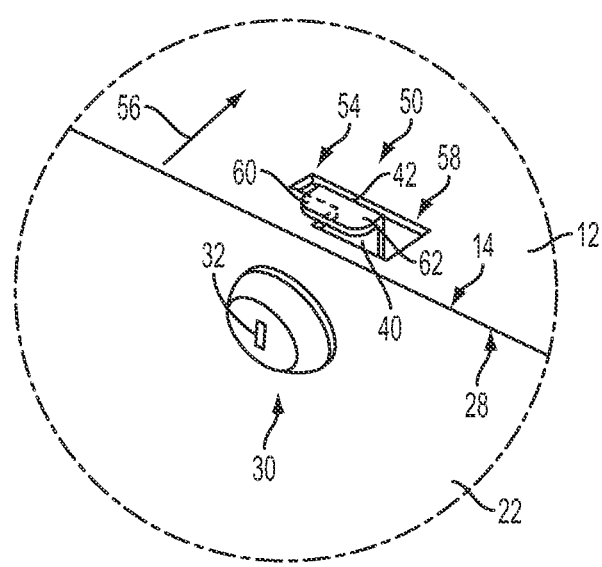
FIG. 4 is a perspective view of the door of FIG. 1 in a closed position with the cam lock in a second orientation.
Figure 5:
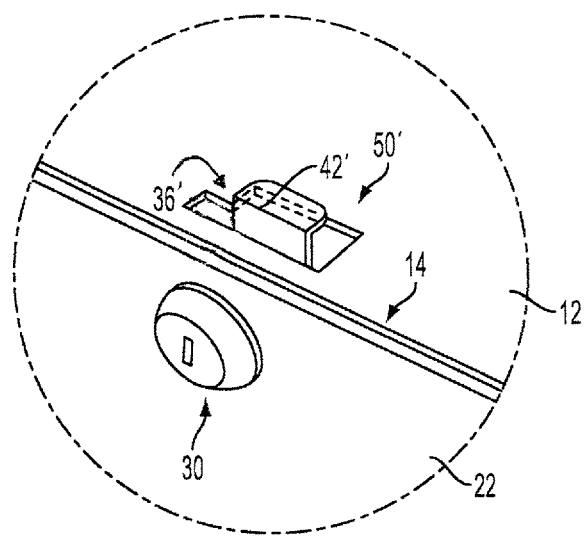
FIG. 5 is a perspective view of a housing having a keeper according to another embodiment of the invention.
Figure 6:
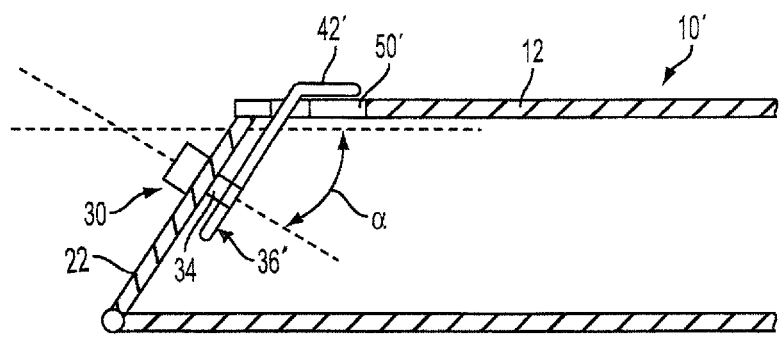
FIG. 6 is a sectional side elevational view of a housing and keeper according to another embodiment of the invention.

A keeper 50 is formed near first edge 14 of top panel 12 and comprises an opening extending through the top panel 12 with a closed periphery and an interior side wall 52, as shown in FIGS. 2-4. The keeper 50 includes a first portion 54 having a first width in a direction perpendicular to first edge 14 (indicated by arrow 56) and a second portion 58 having a second width greater than the first width of the first portion 54. FIG. 5 is a perspective view of a housing having a keeper 50' according to another embodiment of the invention. The keeper 50' is used with a cam 36' having a cam second end 42' that faces in the opposite direction as cam second end 42. FIG. 6 is a sectional side view of a housing 10' with the keeper 50' according to another embodiment of the invention. FIG. 6 illustrates that the door 22 may be arranged at an angle α relative to the top panel 12.

In use, a user positions cam 36 so that cam body 40 does not extend beyond free edge 28 of door 22 and closes door 22 until door 22 contacts first edge 14 of top panel 12. Using a key, not illustrated, keyway 32 and cylinder 34 are rotated to move cam second end 42 toward keeper 50. Cam second end 42 has a width in the direction 56 that is greater than the width of keeper first portion 54 and less than the width of keeper second portion 58, and cam second end 42 thus passes freely through keeper second portion 58 as cylinder 34 rotates. With continued rotation, cam second end 42 rises above the plane of the top panel 12, and cam body 40 enters the first portion 54 of keeper 50 which first portion 54 is sufficiently wide to accommodate the width of cam body 40 but, as mentioned above, is too narrow to allow cam second end 42 to pass therethrough. Cylinder 34 is locked in a position that holds cam body 40 in keeper first portion 54 with cam second end 42 above top panel 12 with a first section 60 of the cam second end 42 overlying a portion of the top panel 12 adjacent keeper 50 and a second section 62 of the cam second end 42 overlying the keeper second portion 58.

Cam body 40 fits in first portion 54 of keeper 50 with little clearance and engages side wall 52 of the keeper 50 if a user attempts to move door 22 away from top panel 12 while cam body 40 is in first portion 54. At the same time, angled cam second end 42 substantially prevents top panel 12 from being pried away from door 22 in a manner that would defeat a conventional cam without a bent second end 42. Thus, lock 30 is used in a substantially similar manner as a conventional cam lock but provides the added advantage of making the housing tamper resistant.

Figure 7:
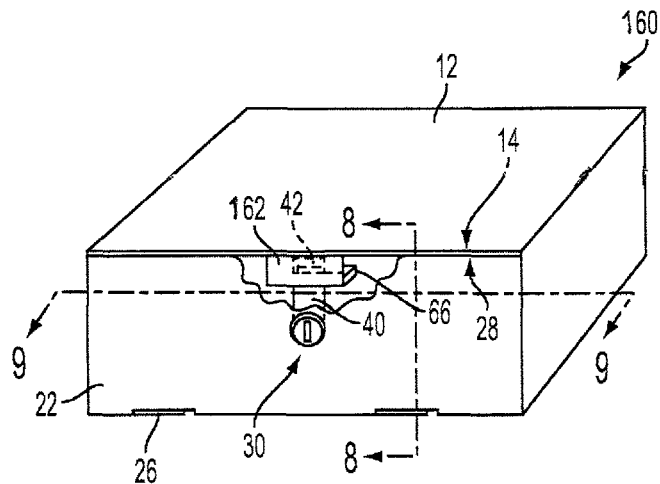
FIG. 7 is a perspective view of a housing and keeper according to another embodiment of the invention.
Figure 8:
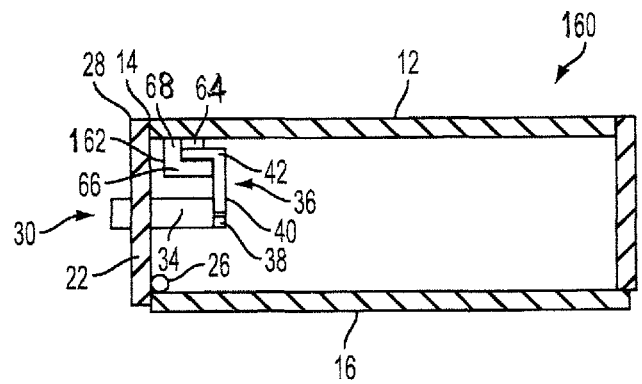
FIG. 8 is a sectional side elevational view taken in the direction of line 8-8 in FIG. 7.
Figure 9:
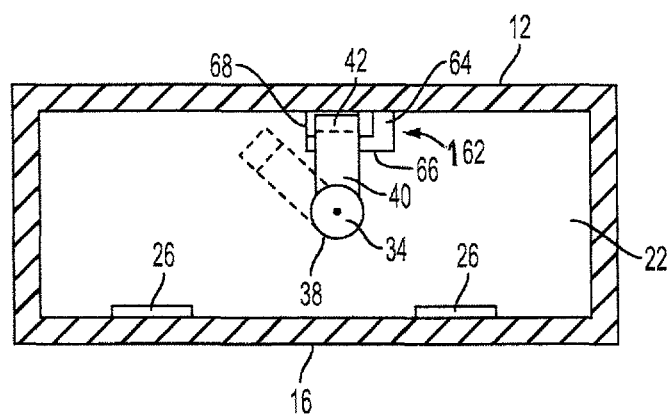
FIG. 9 is a sectional rear elevational view taken in the direction of line 9-9 of FIG. 7.
Figure 10:
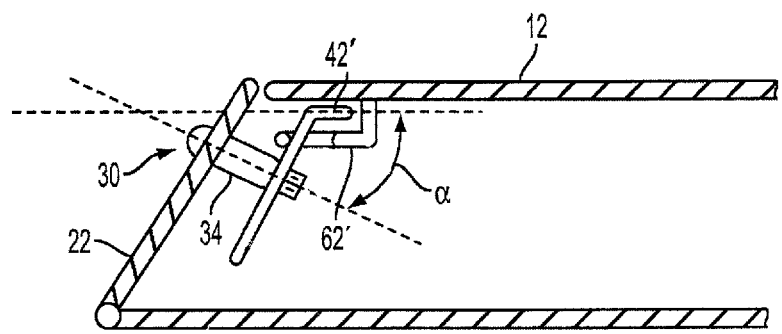
FIG. 10 is a sectional side elevational view of a housing and keeper according to another embodiment of the invention.
Figure 11:
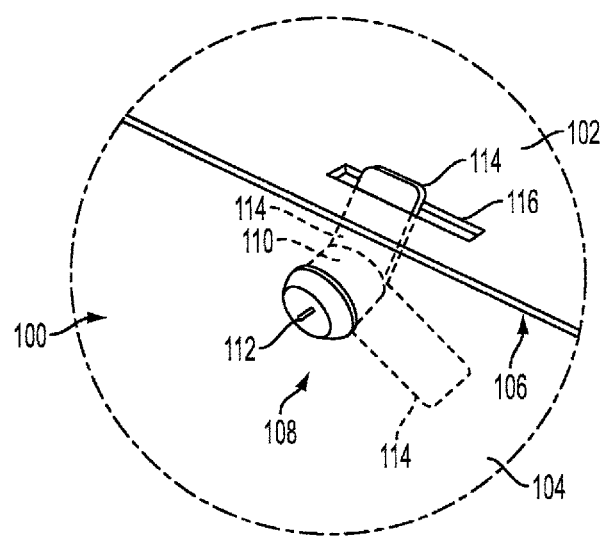
FIG. 11 is a perspective view of a housing having a closed door secured by a conventional cam lock.

FIGS. 7-9 illustrate a housing 160 according to a second embodiment of the present invention in which elements common to the first embodiment are identified with like reference numerals. Housing 60 includes a keeper 162 comprising a member 64 depending from an inner side of top panel 12, a first wall 66 connected to member 64 and extending parallel to the top panel 12 and a second wall 68 perpendicular to member 64 and to first wall 66. Cam second end 42 pivots between first and second positions as described in connection with the first embodiment, but in the second position, cam second end 42 projects between first wall 66 and housing top panel 12 with cam body 40 on the side of second wall 68 opposite door 22. The chain-dashed lines in FIG. 9 show cam 36 moving toward this locked orientation. With cam 36 projecting directly toward housing top panel 12, cam body 40 engages second wall 68 when a user attempts to pivot door 22 away from housing top panel 12, and cam second end 42 prevents the upward movement of keeper second wall 68 which helps prevent top panel 12 from being pried away from door 22. In this embodiment, keeper 160 is hidden when door 22 is closed which may be aesthetically preferable in some situations. FIG. 10 is a sectional side view of a housing and keeper 62' according to another embodiment of the invention. FIG. 10 illustrates that the door 22 may be arranged at an angle α relative to the top panel 12.

The present invention has been described above in terms of presently preferred embodiments. Obvious changes and additions to these embodiments will become apparent to those of ordinary skill in the art upon a reading of the foregoing disclosure. It is intended that all such changes and additions comprise a part of the present invention to the extent they fall within the scope of the several claims appended hereto.

What is claimed is:

1. A housing comprising:
   a first panel lying in a first plane and including a keeper;
   a support member spaced from the first panel;
   a door having a hinge edge hingedly connected to the support member and a free edge opposite the hinge edge, the door being shiftable between a first position with the free edge adjacent the first panel and keeper and a second position with the free edge spaced from the first panel and keeper; and
   a lock mounted on the door, the lock comprising a rotatable cylinder having an axis of rotation and a cam connected to the cylinder for rotation with the cylinder, said cam having a first end and a second end spaced from the first end by a cam body, the second end extending at an angle to the cam body and lying in a second plane;
   wherein, when the door is in the first position, the cam is shiftable from a first orientation with the cam second end spaced from the keeper to a second orientation with the cam second end overlying a side of the keeper opposite the cylinder to lock the door; and
   wherein said keeper comprises an opening extending through the first panel and includes a first portion having a first width taken in a first direction and a second portion having a second width taken in the first direction, the second width being greater than the first width, wherein the cam second end presents a length taken in the first direction, and wherein the cam second end length is greater than the first width.

2. The housing of claim 1, wherein the cam body engages the keeper to prevent the door from moving toward the second position when the cam is in the second orientation, wherein the first position of the door is generally perpendicular to the first panel, wherein the axis of rotation of the rotatable cylinder is perpendicular to the door, and wherein the second plane is parallel to the axis of rotation.

3. The housing of claim 2, wherein the second end is spaced from the keeper when the cam body engages the keeper.

4. The housing of claim 1, wherein the opening has a continuous periphery.

5. The housing of claim 4, wherein the opening has a side wall, and wherein the cam body but not the cam second end contacts the opening side wall to maintain the door in the first position when the cylinder is in the second orientation and wherein the second end but not the cam body contacts an outer surface of the first panel when the cylinder is in the second orientation if the first panel is pulled away from the cylinder.

6. The housing of claim 1 including first and second brackets configured for supporting the housing in a rack.

7. The housing of claim 6, wherein the housing comprises an optical fiber shelf.

8. The housing of claim 1 wherein the support member comprises a second panel parallel to the first panel.

9. The housing of claim 1, wherein the cylinder is key actuated.

10. A housing comprising:
a first panel lying in a first plane and including a keeper;
a support member spaced from the first panel;
a door having a hinge edge hingedly connected to the support member and a free edge opposite the hinge edge, the door being shiftable between a first position with the free edge adjacent the first panel and keeper and a second position with the free edge spaced from the first panel and keeper; and
a lock mounted on the door, the lock comprising a rotatable cylinder having an axis of rotation and a cam connected to the cylinder for rotation with the cylinder, said cam having a first end and a second end spaced from the first end by a cam body, the second end extending at an angle to the cam body and lying in a second plane;
wherein, when the door is in the first position, the cam is shiftable from a first orientation with the cam second end spaced from the keeper to a second orientation with the cam second end overlying a side of the keeper opposite the cylinder to lock the door; and
wherein:
the keeper comprises an opening in the first panel;
the opening extends through the first panel and has a continuous periphery;
the first panel includes a first edge,
the opening includes a first portion having a first width in a direction perpendicular to the first edge and a second portion having a second width in the direction, the second width being greater than the first width,
the cam second end has a length in the direction, and
the cam second end length is greater than the first width.

11. The housing of claim 10, wherein the cam is configured such that the cam second end passes through the opening second portion when the cam moves from the first orientation to the second orientation.

12. The housing of claim 11, wherein the first panel has an inner side facing a housing interior and an outer side opposite the inner side and wherein the cam second end overlies the first panel outer side when the cam is in the second orientation.

13. The housing of claim 12, where the door free end contacts the first panel when the door is in the first position.

14. The housing of claim 12, wherein the cylinder is key actuated.

15. The housing of claim 11, wherein the first panel has an inner side facing a housing interior and an outer side opposite the inner side and wherein when the cam is in the second orientation, the cam second end has a first section overlying the first panel outer side and a second section overlying the opening second portion.

16. The housing of claim 10 including first and second brackets configured for supporting the housing in a rack.

17. The housing of claim 16, wherein the housing comprises an optical fiber shelf.

18. A housing comprising:
a first panel lying in a first plane and having an inner side facing into the housing and an outer side opposite the inner side, a first edge and an opening having a side wall extending through the first panel and having a continuous periphery spaced from the first edge, the opening including a first portion having a first width in a direction perpendicular to the first edge and a second portion having a second width in the direction, the second width being greater than the first width,
a second panel parallel to and spaced from the first panel;
a door having a hinge edge hingedly connected to the second panel and a free edge opposite the hinge edge, the door being shiftable between a first position with the free edge in contact with the first panel and a second position with the free edge spaced from the first panel;
a lock mounted on the door, the lock comprising a key actuated rotatable cylinder having an axis of rotation perpendicular to the door and a cam having a first end connected to the cylinder for rotation with the cylinder and a second end spaced from the first end by a cam body, the second end extending at an angle to the cam body and lying in a second plane parallel to the axis of rotation and having a length in the direction greater than the first width;
wherein, when the door is in the first position, the cam is shiftable from a first orientation with the cam second end inside the housing to a second orientation with the cam second end overlying the first panel outer side, and
wherein the cam body passes through the opening and engages the side wall of the opening to prevent the door from moving toward the second position when the cam is in the second orientation and the cam second end is spaced from the first panel when the cam body is located in the first portion of the opening.

* * * * *